United States Patent

[11] 3,534,820

[72] Inventor Merlin A. Groenke
 Glencoe, Minnesota
[21] Appl. No. 680,064
[22] Filed Nov. 2, 1967
[45] Patented Oct. 20, 1970
[73] Assignee Portable Elevator Mfg. Co.
 Bloomington, Illinois
 a corporation of Illinois

[54] LEVEL AND DEPTH CONTROL FOR CULTIVATING APPARATUS
 3 Claims, 3 Drawing Figs.
[52] U.S. Cl. .................................................. 172/413,
 172/311, 280/43.19
[51] Int. Cl. ...................................................... A01b 62/22,
 A01b 49/00
[50] Field of Search .......................................... 172/413,
 311, 502, 395, 310, 456; 280/43.19

[56] References Cited
UNITED STATES PATENTS
2,960,346 11/1960 Hunter .......................... 172/502
3,362,483 1/1968 Twidale ......................... 172/311

Primary Examiner—Robert E. Pulfrey
Assistant Examiner—Stephen C. Pellegrino
Attorney— Schroeder, Siegfried and Ryan ABSTRACT: This invention in level and depth control is applied to cultivating apparatus of the wing type and includes the use of a single-power actuator for elevating a plurality of wheel supports relative to the frame or frames upon which the working tools are mounted for the purpose of elevating and lowering the tools relative to the earth to be worked. The level and depth control structure includes a cable system from the actuator to the wheel support to adjustably connect the individual cables for each wheel support through an arm for rocking the same and with an adjustably positioned shaft mounted on the individual frames of the cultivator for limiting rocking movement to adjust depth control.

Patented Oct. 20, 1970

3,534,820

INVENTOR.
MERLIN A. GROENKE

BY Schroeder, Siegfried
 & Ryan    ATTORNEYS

3,534,820

LEVEL AND DEPTH CONTROL FOR CULTIVATING APPARATUS

This invention relates to cultivating apparatus and more particularly to an improved cultivating apparatus of the type having ground support wheels in which working depth of associated implement or cultivating tools is adjustable by moving the support wheels relative to the frame which mounts the cultivating tools and in which the level of the frame and the depth of cultivation is adjustable.

The cultivating apparatus referred to herein relates particularly to the wheeled type of apparatus which is adapted to be drawn by suitable motive means such as tractors and in which the apparatus is adjustable between working and transport positions. Further, it is particularly adaptable to the wide or wing-type cultivating apparatus which in modern farming will cover extremely wide working widths of cultivation and in which wing sections are foldable on a main frame for transport or storage conditions. In prior cultivating apparatus, work depth and adjustment between a working and transport condition has been accomplished through various means. In certain instances the individual tools may be separately mounted apart from the frame and adjusted independent of the wheel support. In still other versions, a hydraulic system with a solid connection between the pivoted ground support wheels may be employed. In addition, individual actuators for each wheel may be applied. These become expensive designs and are not practical for extremely wide width cultivators where portions are foldable on the same. The implement type to which the present invention applies is characterized by a laterally or generally horizontally disposed main frame with a drawbar attached thereto and a plurality of downwardly depending implement mountings distributed over portions of the frame. The frame is carried by a plurality of ground wheels and sections of the same may be pivoted relative to a main or central portion with each section being supported by a wheel or wheels. The pivoted ground wheels are adjustable relative to the main and wing frames through the use of a hydraulic system employing a single hydraulic actuator which is connected to the individual journaled wheels by separate cable systems. Thus, the cultivator is adjustable from working to transport conditions, that is the implement tools are raised or lowered, through operation of a single hydraulic actuator which through a cable system will cause the individual wheels to pivot relative to the main frame or rock relative thereto, to adjust the position of the supporting wheels vertically with respect to the frame or frames. Such apparatus has the problem of cable stretch and the adjustment of the same.

In the present invention, an improved system is employed wherein each individual ground support wheel is connected to a cable system through an adjustable linkage and in which this linkage serves as part of a limit or depth control which is similarly adjustable to provide a simplified arrangement of leveling a wide wing cultivator and to limit or adjust the depth of cultivation of the same. This improved level and depth control includes a linkage on the ground support wheels and a linkage on the end of the cable which cooperates to provide a threaded type adjustment which may be readily made in the field by an operator with the ground support linkage portion of this adjustment serving as an abutment for an adjustable stop to control depth of cultivation.

Therefore, it is the principal object of this invention to provide an improved cultivating apparatus of this type.

Another object of this invention is to provide in a cultivating apparatus of the wing type an improved leveling and depth control.

A still further object of this invention is to provide in apparatus of this type a simplified arrangement of parts which is easy to use and may be effected by an operator in the field without special tools.

These and other objects of this invention will become apparent from a reading of the attached description together with the drawings wherein.

Figure 1:
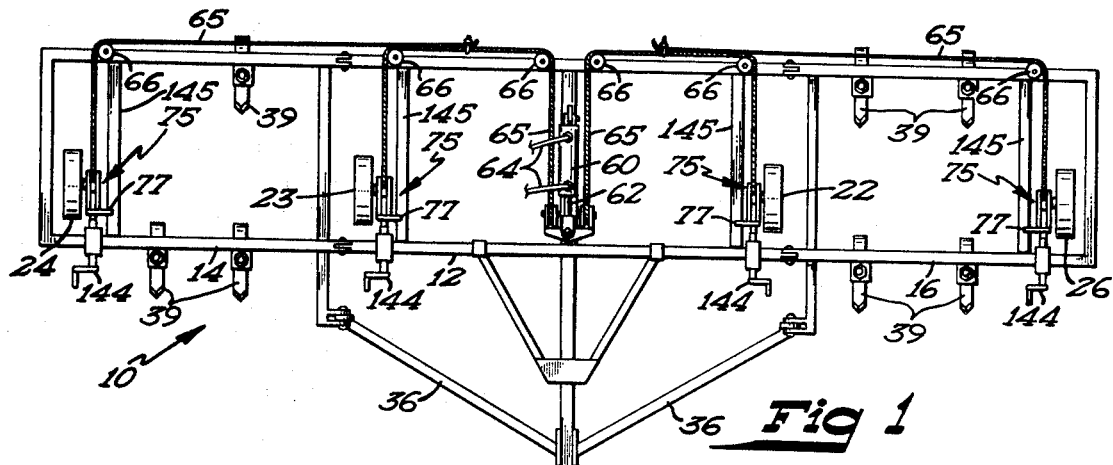
FIG. 1 is a plan view of a wing cultivator utilizing the improved level and depth control of the present invention.

My improved level and depth control is shown herein in connection with cultivating apparatus of the wide wing type. In FIG. 1, there is shown a perspective view of a wide wing cultivator indicated generally at 10, the cultivator being comprised of a main frame 12 and pivotally mounted wing sections 14 and 16. It will be understood that this improved level and depth control may be applied to single-section cultivating apparatus as distinguished from foldable wing cultivators, but it is particularly applicable to the wing cultivator structure for reasons to be hereinafter noted. Thus, the cultivating apparatus as shown in FIG. 1 incorporates a main frame centrally located and having wheels 22, 23 pivotally mounted thereon to support the main frame. In addition, each of the wing sections includes a separate wheel support such as is indicated at 24 and 26. The entire structure is connected through a drawbar structure, indicated generally at 35, which is connected to the main frame section and with additional side section such as is indicated generally at 36 pivotally connected to one another and to the individual wing sections to make an overall composite drawbar structure. A wing cultivator of this type would mount a plurality of depending cultivating tools, such as chisel plows, indicated generally at 39 and these plows would be disposed at various positions on the main frame in a staggered relationship and in a conventional manner to provide an overall cultivating apparatus. A wing cultivator of this type is shown in my prior U.S. Pat. No. 3,321,028 dated May 23, 1967, and entitled "Foldable Implement Mounting for Transporting the Same."

Apparatus of this type employs ground wheel supports which support the various central and wing frame portions in both a working and a transport position. The particular ground wheel supports, as will be later noted, are pivotally mounted on the respective frame portions and rockable thereto to change the position of the frame relative to the earth or surface upon which the cultivator is resting. With such a change in relative position, the working tools may be elevated to a position above the ground for transport purposes or lowered to contact the ground at a predetermined depth for working or cultivating purposes in a conventional manner.

Figure 2:
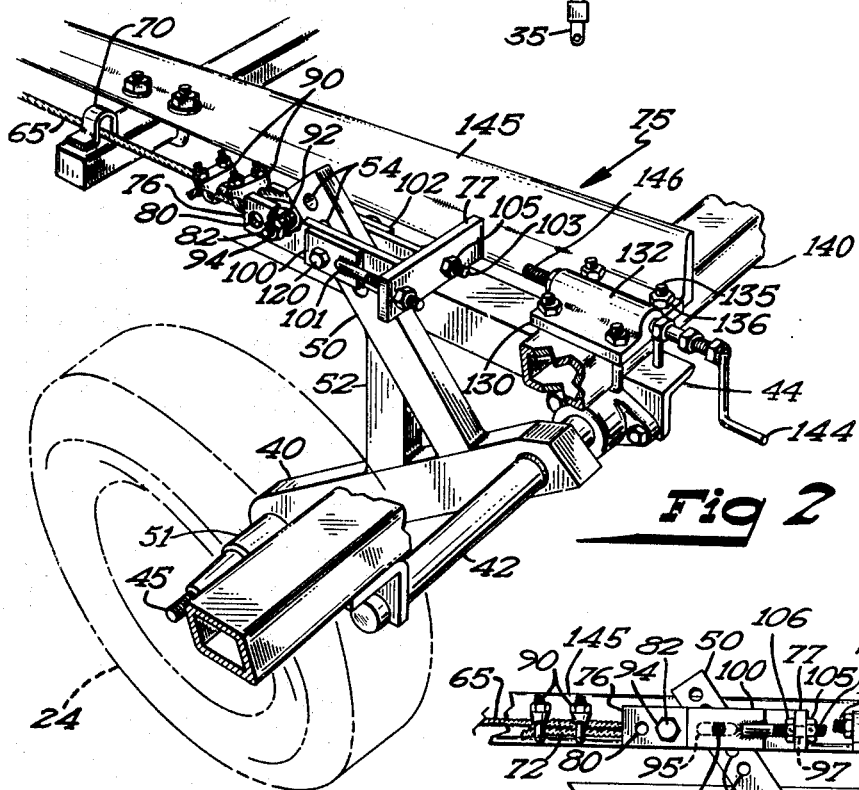
FIG. 2 is a perspective view of a portion of a cultivating apparatus of FIG. 1 showing a ground wheel support and the connections thereto to disclose the arrangement of parts of the improved level and depth control of the present invention.
Figure 3:
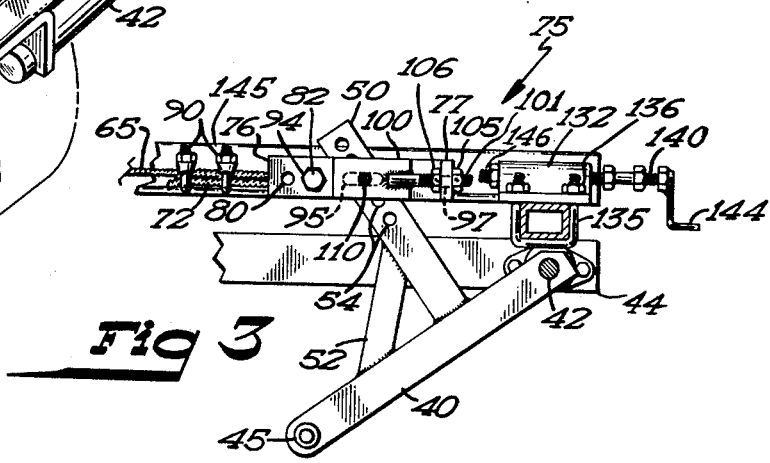
FIG. 3 is an elevational view in section of the level and depth control apparatus of the present invention.

Each of the wheel-support structures 22, 23, 24 and 26 are identical in form and one such structure is shown in perspective view in FIG. 2 and in section in FIG. 3. Therefore, only one will be described in detail since its structure and operation will be identical with all the remaining wheel supports in the cultivating apparatus. As will be seen in FIGS. 2 and 3, individual wheel-support structure is comprised of a mounting arm 40 having a transversely extending shaft 42 positioned through one extremity of the same, the shaft 42 being adapted to be mounted on and journaled in supporting flanges 44 connected to the frame sections. The opposite extremity of the arm 40 remote from the journaling shaft 42 mounts a cantilever-type stub shaft 45 which is rigidly attached to the arm 40 and provides the bearing surface for the actual wheel, shown in FIG. 2 at 51. The wheel is mounted through a suitable bearing (not shown) on the stub shaft 45 in a conventional manner. Arm 40 includes an upstanding flange or bracket 50 integrally connected to the arm 40 through suitable means such as welding. The upper extremity of the flange 50 includes a plurality of mounting holes 54, the purposes of which will be later explained. Each of the arms 40 for the various wheel support structures mounts a separate wheel and are journaled in portions of the various frame sections to provide a rocking movement for the tire or wheel 50 which will be moved effectively in a vertical direction relative to the frame to raise or lower the same with respect to the ground upon which the wheel will roll. The upstanding flange or bracket 50 provides the connection to the arm by means of which the arm is pivoted about the journaled shaft 42 on the frame to provide this rocking movement. A cable system for each wheel-support structure is provided which will connect the respective wheel-support structure to a single actuator mounted on the central frame or in an appropriate position on the cultivating apparatus so that a single actuator may be utilized to elevate all of the wheel supports simultaneously to effect a change in the position of the cultivating apparatus from a working to a transport position.

The cable system includes a hydraulic actuator 60 having an output shaft 62 mounted on the main frame and having suitable fluid connections or conduits 64 thereon suitable for directing fluid into and out of the actuator to provide directional control of the output shaft 62. The output shaft is connected to the cable system including a plurality of cables 65 which lead on the main frame and over pulleys 66 to each of the respective wheel supports. Suitable cable guides 70 positioned on the respective frame portions maintain the cables in alignment, particularly when the wing sections are folded. The ends of the cables, such as is indicated at 72, remote from the output shaft 62 of the actuator are connected through a coupling member indicated generally at 75, to the upstanding bracket or flange 50 of the wheel support. As will be seen in FIGS. 2 and 3, this coupling member is a generally U-shaped or bifurcated structure having arm portions 76 connected to or formed integral with a back portion 77 which extends beyond the arm portions for purposes to be later noted. The arms have apertures 80 in the free extremity of the same through which a mounting bolt 82 secures the ends of the cables. Each of the cables are folded over on themselves and connected through U-shaped bolt and nut members 90 with the bolt 82 having a guide and spacer 92 positioned over the same to mount the loop of the cable and with suitable securing nuts 94 threaded onto the bolt to secure the cable in the bifurcated arms 76 of the coupling member 75. The cable may be adjusted to any one of the apertures 80, only two of which are shown, to provide one adjustable connection for the cable length. Arms 76 include slots 95 therein intermediate the extent of the arms and the back or bracket portion 77 includes apertures 97 therein through which a pair of plate members 100 and 102 are mounted on the back portion 77 of the coupling member 75. The plates have threaded shafts 101 and 103 formed integral therewith which extend through the apertures 97 in the bracket portion 77 of the coupling member and suitable nuts 105 and 106 are positioned on the threaded shafts on either side of the bracket to positively position the plates relative to the bracket. The plates each have an aperture 110 therein which align with the slots 95 in the arms 76 such that the plates 100, 102 may be adjustably positioned relative to the slot. A suitable bolt member 120 positioned through the plates 100, 102 and extending through the slots 95 in the arm portion 76 of the coupling member also pass through one of the apertures 54 in the upstanding flange 50 of the arm for the respective wheel support. By positioning the bolt 120 through any one of the various apertures 54, an adjustment may be made in the position of the arm 40 relative to the frame for a reference position. Similarly, by threading the shaft 101, 103 of the plate members 100, 102 to varying positions relative to the bracket 77, the connecting member may be adjustably positioned relative to the flange 50. Hence the cable connected thereto will be similarly positioned to change the level of the wheel support or the cultivating apparatus by changing the position of the wheel support and hence the wheel mounted thereon relative to the frame. The bolt 120 extending through the plates 100, 102 which are positively connected by means of the nuts 105, 106 thereon on either side of the bracket portion 77 of the coupling member will positively position or connect the coupling member to the bracket 50 of the arm 40 for each of the wheel supports. Thus, the rest position for the wheel support and hence the wheel 24 thereon relative to the frame may be adjusted to compensate for variation and length of the cable. This adjustment may be affected by positioning the cable extremity into one or the other of the apertures 80 in the ends of the bifurcated arms or by adjusting the bolt 120 through any one of the apertures 54 in the upstanding bracket 50 for the mounting arms of the wheel support and a finer adjustment may be affected by adjustably positioning the plates 100, 102 relative to the bracket portion or back portion 77 of the connecting member. In this manner, the cultivating apparatus may be adjusted in the normal rest or transport position so that the frames will be aligned and be substantially in a horizontal or similar plane such that when the apparatus is moved to a work position each of the cultivating tools will be set at the same depth for uniform cultivation.

As will be seen in FIGS. 2 and 3, each of the frame parts will also mount a plate member 130 having a centrally located journal or threaded section 132 formed integral therewith, the plate being attached to the frame through suitable U-bolts 135 and nuts 136 extending through apertures 137 in the plate to secure the same to the frame. Threaded through the journal or threaded section 132 is a threaded shaft 140 having a crank or handle portion 144 thereon. The opposite extremity of the threaded shaft 140 remote from the handle projects through the journal section 132, as indicated at 146, and is aligned in the plane of movement of the arm 40 and the bracket 50 of the wheel support. This extremity contacts the edge surface of the bracket 50 for the wheel support as the arm is rocked by the actuator movement and the flange or bracket 77 of the coupling 75 moves over the shaft extremity as it is rotated with the arm when the wheel supports are rocked. By threading the shaft 140 into and out of the threaded journal section 132 on the individual frame sections for each wheel support, a stop is effected on the wheel support limiting rotation or rocking movement of the wheel support relative to the frame to limit depth of cultivation. Thus, in a wide wing cultivator or in cultivating apparatus in general, each wheel support may be limited in its range of pivotal movement to effect a limit and vertical adjustment for each wheel relative to the corresponding or mounting frame to adjust the depth of cultivation or the depth at which each of the working tools 40 will penetrate the earth. By uniformly adjusting all such s.op structures relative to their respective wheel support brackets 50, the depth of cultivation may be set for any given cultivating apparatus.

The extended portion of the bracket 77 of the coupling member 75 overlies a cross brace of the frame such as is indicated at 145 in FIGS. 2 and 3 for the main and wing frames 12, 14 and 16. This extended portion of bracket acts as a stop to limit rotation of the wheel support in a counterclockwise direction as seen in FIG. 3. It is effective to prevent the wheel support from pivoting beyond the desired position as the wing sections are raised for a transport position of the cultivator. Thus, when the wing sections are raised off of the ground, there is no longer any force applied to the same to maintain the wheel support in position against the tension of the cable and the wheel supports would be free to pivot in a counterclockwise direction. By limiting their movement in this raised position, the wheel supports will always be in a proper location and will coincide with the wheel supports on the main frame as the wing sections are lowered preparatory to place the cultivator in a working position.

In wide wing cultivators, the individual sections will normally be folded in part on one another to prepare the apparatus for transport to and from areas of usage. The individual cable systems will remain slack as the wing sections are folded up and one type of structure for effecting such folding and bracing the sections thereon is shown in my prior U.S. Pat. No. 3,321,028 referred to above. The strain of raising and lowering the wing sections and the normal strain on the cable systems in elevating and lowering the frames and working conditions will result in stretching of the individual cables 65 leading from the actuator to the individual wheel support. In the past, this required the operator to disconnect each cable and attempt to rebend the same and recouple the same to the wheel support so that the cultivator would remain in a trim or level position. With the improved invention, the operator need merely select one of several adjustments either in the connection of the cables to the coupling member, the connection of the coupling member to the upstanding brackets 50 of the wheel supports or in the minor adjustment of repositioning the side plates 100, 102 through their threaded adjustment on the bracket 77 of the coupling member 75 to affect a change in position of the cable relative to the wheel support to bring a portion of the cultivating apparatus back to a level position or in alignment with the remaining portions thereof. This improved structure is particularly applicable to cultivating apparatus where cable systems are utilized and in connection with wide wing cultivators which require cable systems as distinquished from solid connections between actuators and wheel support. It permits usage of a single actuator to greatly simplify the elevating apparatus for the cultivator and permits a simplified depth control adjustment on the cable system to allow an operator to vary the depth of cultivation of his apparatus.

I claim:

1. In a cultivator having a translationally extending tool-supporting frame with wheel-supporting arms pivotally connected on the frame toward the ends thereof and mounting wheels at the extremity of the supporting arms opposite the pivotal connection on the frame such that the pivoted arms with the wheels thereon, when pivoted relative to the frame, will raise and lower the frame with respect to the ground upon which the wheels are riding, the improvement residing in a single-power actuator mounted on the frame remote from the wheel-supporting arms, separate cables extending from the power actuator to each of the wheel-supporting arms, a connector member formed integral with the wheel-supporting arms and extending upwardly and being operatively connected to the cable, a coupling member positioned between the extremities of the cables and each of the connector members for the wheel-supporting arms with the coupling members securing the cables at one extremity and including an adjustable connection between the coupling means and the connector member to vary the length of the cable and hence the position of the wheel-supporting arms relative to the frame to level the frame, said single actuator being operative to pivotally displace the wheel-supporting arms relative to the frame to raise the frame and hence any tools thereon between transport and working positions, said coupling member including a pair of spaced elongated plates formed integral with a transversely extending plate with apertures in one extremity to secure the cable therein and with an eliptical aperture intermediate its extent, and a pair of adjustable side plates threaded at one extremity and having an aperture therethrough through which a pin extends and through the eliptical apertures to an aperture in the connector member for the wheel-supporting arms to adjustably position the relative position of the wheel-supporting arms relative to the main frame and including stop means mounted on the frame and engageable with the coupling member to limit movement of the wheel-supporting arms with the wheels thereon relative to the frame in one direction.

2. The cultivator of claim 1 in which the transversely extending plate of the coupling member is aligned and engageable with the stop means to limit movement of the wheel-supporting arms relative to the main frame for one direction of movement.

3. The cultivator of claim 2 in which the power actuator is a hydraulic actuator movable between two extreme positions and with an operating shaft connected to separate cables leading to the respective wheel-supporting arms mounting the wheels for the cultivator.